July 9, 1968 B. D. KUMPFER 3,391,579
EXTREMELY SENSITIVE PENDULOUS ACCELEROMETER
Filed Jan. 15, 1964 3 Sheets-Sheet 1
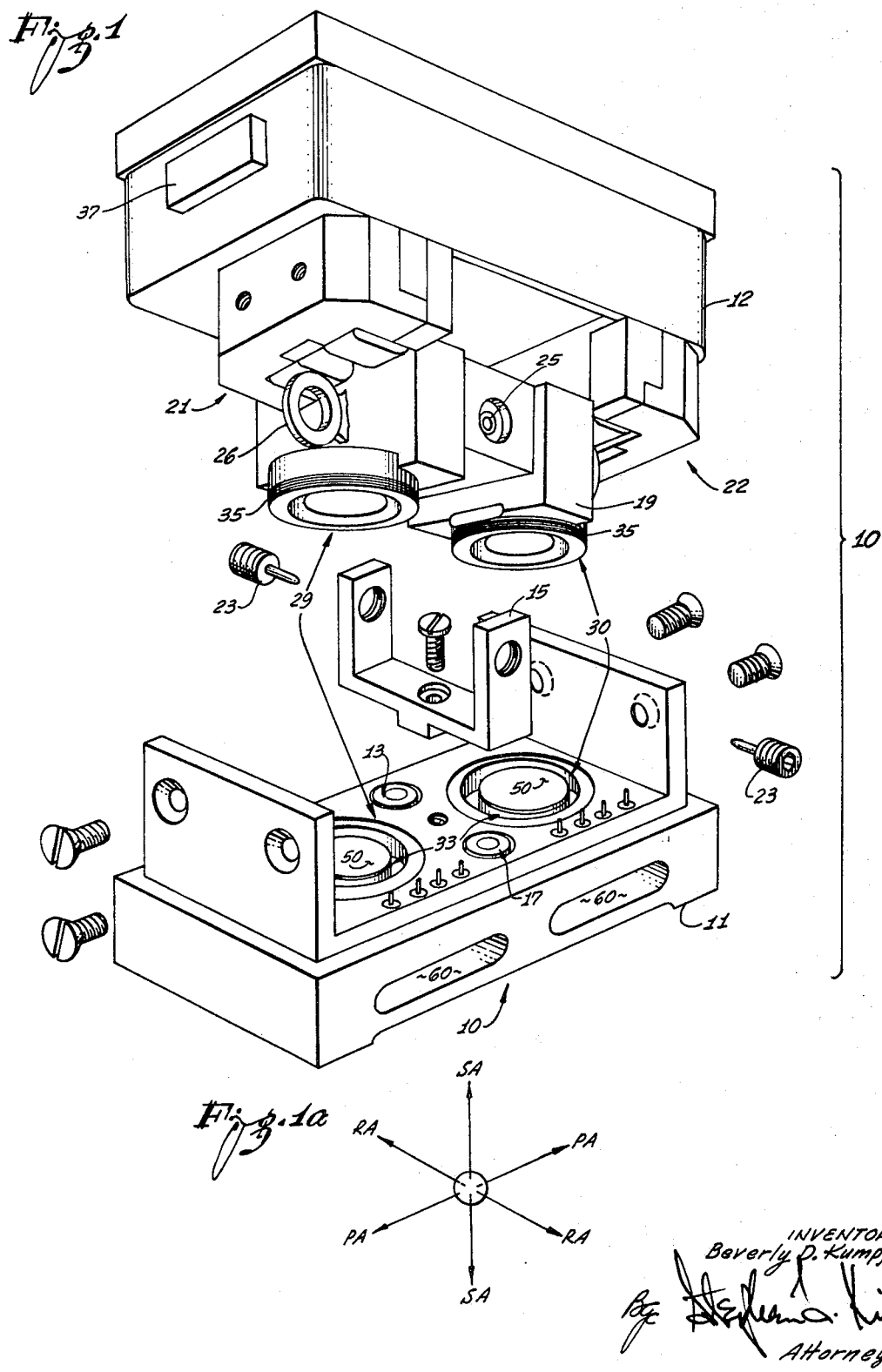
INVENTOR
Beverly D. Kumpfer
Attorney July 9, 1968   B. D. KUMPFER   3,391,579
EXTREMELY SENSITIVE PENDULOUS ACCELEROMETER
Filed Jan. 15, 1964   3 Sheets-Sheet 2
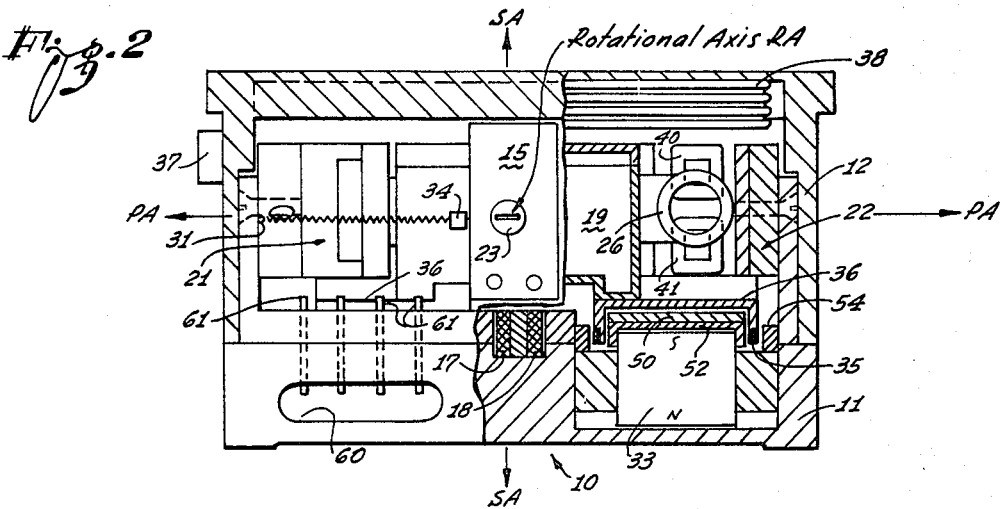
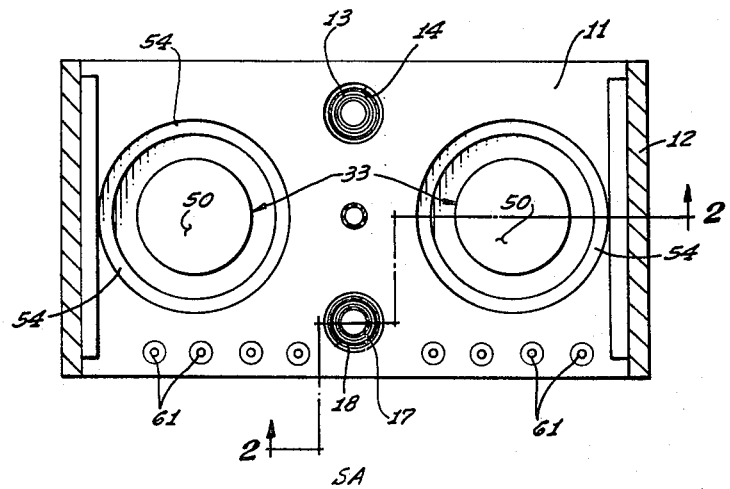
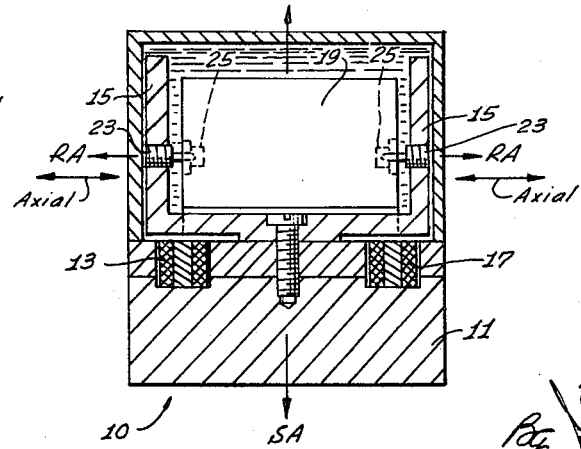
INVENTOR
Beverly D. Kumpfer
Attorney

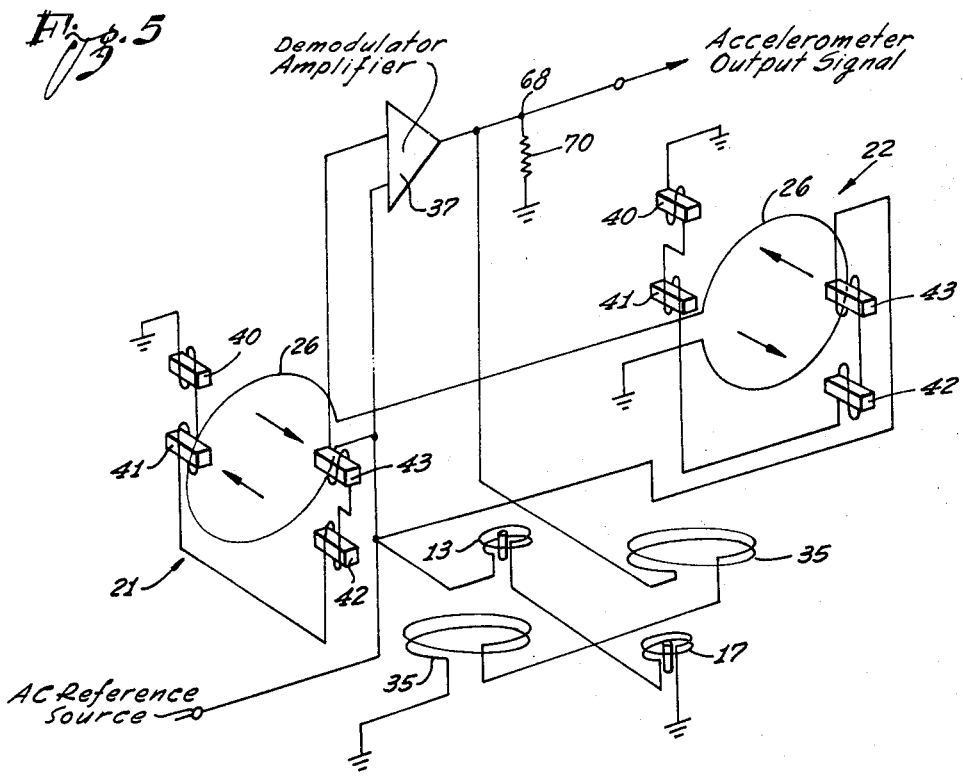

United States Patent Office 3,391,579
Patented July 9, 1968

3,391,579
EXTREMELY SENSITIVE PENDULOUS
ACCELEROMETER
Beverly D. Kumpfer, Salt Lake City, Utah, assignor to
Litton Systems, Inc., Beverly Hills, Calif.
Filed Jan. 15, 1964, Ser. No. 337,931
17 Claims. (Cl. 73—517)

The present invention relates to a pendulous accelerometer having an extremely low threshold sensitivity and, more particularly, to a torque-balance, pendulous accelerometer employing an axially vibrated pendulum support structure which operates to eliminate static friction and substantially reduce kinetic friction in the pendulum support bearings to render the accelerometer more sensitive and accurate by reducing the accelerometer threshold and null uncertainty and optimizing linearity over a wide range of applied acceleration.

An accelerometer is an instrument for determining the acceleration of a moving vehicle. In inertial navigation, an accelerometer is an instrument that senses acceleration forces applied to the instrument in a particular sense and, in response thereto, generates a proportional output signal. A principal application of accelerometers is in inertial and celestial navigation systems of airborne and space vehicles. In such systems accelerometers are mounted to a stable element, which defines a particular coordinate system of an inertial platform, so as to sense vehicle accelerations along known coordinate axes. By continuously integrating the vehicle accelerations detected by the accelerometers, the vehicle velocity, position and distance traveled relative to the starting point can be continuously determined. Since, for effective guidance of the vehicle the guidance system must be able to compute the vehicle's velocity and position accurately, it follows that the sensitivity and sensing accuracy with which the accelerometers operate ultimately influence the accuracy of the guidance system.

In an effort to create a more sensitive and accurate accelerometer, substantial contributions have been made which have greatly transformed the accelerometer from its basic construction. The basic pendulous accelerometer employs a pendulous element that is supported within an accelerometer housing by a pair of coaxially aligned support bearings which restrain movement of the pendulous element to pivoting in a plane about a rotational axis defined by the support bearings. An arbitrary neutral position of the pendulous element defines the accelerometer's pendulous axis. The pendulous element is caused to pivot from this neutral position about the rotational axis by an imbalance of forces developed orthogonal to both the rotational and pendulous axes of the accelerometer, i.e., along a "so-called" sensitive axis. A sensor detects deviation of the pendulous element from its neutral position in response to acceleration forces and generates a signal proportional to the detected magnitude of displacement. In most accelerometers, a balancing torque is applied to the pendulous element by a pair of forcing units that operate in response to the signal generated by the sensor to maintain the element at its most linear measuring position. The proportionality constant between the magnitude of applied accceleration and the magnitude of counter torque is termed the accelerometer scale factor. It is, of course, an objective in the construction of an accelerometer to have a constant scale factor over a wide range of applied accelerations because the instrument can be made less complex and more accurate if changes in scale factor do not have to be externally compensated. However, it has been found that frictional torques, developed in the pendulum element support bearings, cause an accelerometer's scale factor to be greatly inconstant, even when the accelerometer has been constructed so as to be internally self-compensating to a certain degree for thermally-induced changes in scale factor.

In recent years, a large amount of research effort has been expended to overcome that commonly recognized source of error in the accelerometer, the presence of friction in the bearings which support the pendulous mass. It has been found that the relatively high frictional torques developed in the pendulum support bearings due to static friction severely limit the sensitivity of an eccelerometer since some finite amount of acceleration must be applied to the accelerometer before the pendulous element will begin to pivot. Thus, such frictional torques also severely limit the utility of the accelerometer. Moreover, the frictional effects attributable to kinetic friction occurring in the support bearings cause the accelerometer's response to varied amounts of applied acceleration to be non-linear. To minimize the limitations imposed by such friction, it has been found necessary to construct an accelerometer to employ a buoyant pendulous element that is immersed in an inert fluid for substantially supporting the weight of the pendulous element by buoyant forces. The load carried by the pendulum support bearings is thereby reduced, thereby proportionately reducing the bearing friction.

The present inventor has recognized, however, that even in so-called floated-pendulum type accelerometers there is frictional contact in the bearings (due partially to density variations of the flotation fluid with temperature) which opposes the movement of the pendulous element in response to applied accelerations. This frictional reaction occurs initially in the support bearings as a static friction that must be overcome before the pendulous element will begin to pivot about the rotational axis. It is static friction which limits the accelerometer's threshold sensitivity (the smallest change in velocity which will cause an output signal to be generated by the accelerometer) such that it becomes difficult to measure very small acceleration forces. In addition, the frictional reaction appears as a kinetic friction in the bearings when the pendulous element is pivoting; and it is kinetic friction that tends to make the accelerometer's scale factor non-linear. While it is true that by floating the pendulum element sensitivity is increased, for many inertial applications requiring the use of accelerometers having threshold sensitivities on the order of $1 \times 10^{-5}$ g., even the small uncertainties in sensitivity and scale factor introduced by the subsisting bearing frictions are consequential.

Recognizing these and other disadvantages of the recently developed pendulous accelerometers, the present inventor has turned to a pendulous accelerometer employing a vibrating support member for supporting the pendulum element within an accelerometer housing filled with flotation fluid. By continuously vibrating this support member, the present inventor is able to substantially eliminate most of the detrimental effects of friction. The vibratory motion of the pendulum support member, in the present accelerometer invention, is normally termed in the art as "dither." In the history of the accelerometer art, development of accelerometers successfully employing dithering mechanisms has been virtually nonexistent. This condition exists partly because of intercoupling between the dithering vibration and the response of the pendulous element to acceleration forces unless the dither is introduced at a greatly different frequency than the frequency of excitation of the displacement sensor, and partly because of failure to develop a dithering mechanism that could be employed in accelerometers that are used on inertial platforms without necessitating the addition of signal generating circuitry and extra slip rings in the platform system. For example, when dithering mechanisms have been proposed, it generally has been suggested that the dither be at a substantially different frequency than the frequency of excitation of the displacement sensor. The difference in frequency enables a filter circuit to readily distinguish, in the accelerometer output signal, the dither introduced component from the pendulum displacement component. In order to drive the prior art dithering mechanisms at a different frequency than the frequency of excitation of the displacement sensor, it is necessary to provide an extra set of slip rings at the gimbaling points of the platform stable element. The set of slip rings carry the dither frequency signal from the platform system's signal generating circuitry to the location of the accelerometer on the stable element. Because weight and size are of primary importance in an inertial navigation system, the necessity of supplying an accelerometer with two different signals, which concomitantly necessitates the provision of the two additional sets of slip rings and an additional signal generator, detracts substantially from the benefits accrued by the introduction of the dither in this manner. Moreover, as was stated before, the dither in prior art accelerometers generally intercouples with other forces applied to the accelerometer causing a torque to be applied to the pendulous element. The response of the pendulous element to the torque is interpreted by the displacement sensor as acceleration, which thereby introduces an erroneous signal to the guidance system.

On the other hand, in the accelerometer of the present invention, the dithering mechanism is uniquely constructed so that it can be excited at the same frequency as is the displacement sensor, thereby eliminating the addition of complexity due to extra circuits and weight due to additional slip rings. A noteworthy arrangement is used by the present inventor for introducing dithering motion to the support bearings, which dithering motion greatly improves the response of the accelerometer. And yet, the dither does not couple into the accelerometer output because it is applied by a unique arrangement in a sense parallel to the axis defined by the support bearings. Accordingly, in one embodiment of the present invention, the ability of the pendulum support member to be vibrated at the same frequency as the displacement sensors are excited, is provided by constructing the support member from a ferrous material to be similar in shape to a tuning fork (that is, generally U-shaped) which has a predetermined resonant frequency. Beneath each tine, when the fork is mounted in the accelerometer housing, is positioned an electromagnet. The pair of electromagnets are serially coupled so that they alternately attract and repel their respective tines in unison, in a direction parallel to the sensitive axis of the accelerometer, whenever they are actuated by an AC current. Since, as will be hereinafter explained in greater detail, substantially all of the vibration causing forces attack in the direction of the accelerometer sensitive axis equally at both ends of the pendulum element, a pair of displacement sensors (constructed so as not to respond to pure translational movement of the pendulum element) do not generate erroneous signals in response to the vibratory motion. Yet, the vibratory motion having a component in the direction of the pivot access and also a component perpendicular to it, i.e., in a radial direction, introduced to the pendulum support bearings by the tines of the U-shaped pendulum support member overcomes the bearing friction so well that the displacement sensors are able to reliably detect pendulum displacement due to accelerations on the order of $1 \times 10^{-5}$ g., or better. To achieve this most desirable end in the accelerometer of the present invention, the dithering of the pendulum support member in the present accelerometer is such that it keeps each pivot (of a pair of jewel-and-pivot pendulum support bearings, each comprising a pivot and a corresponding jewel cup) moving and generally centered in its respective jewel cup. In the embodiment of the accelerometer described herein, the vibratory movement, while introduced in a sense perpendicular to the rotational axis of the pendulum element as defined by the pendulum support bearings, occurs substantially in a direction which may be resolved into two components, i.e., it has a component parallel to the rotational axis and a radial component, in such a manner that the static friction between the jewels and the pivots is completely overcome; and, by eliminating static friction in the pendulum support bearings, the accelerometer becomes extremely sensitive to very small applied accelerations. Moreover, when there is rotational motion between the jewels and their pivots, due to applied accelerations, the kinetic frictional force between jewels and pivots is greatly decreased and held to a fairly constant value. Holding the kinetic frictional force to a predictable constant value tends to stabilize the accelerometer scale factor and greatly increase accelerometer linearity.

It is, therefore, an object of the present invention to provide a pendulous accelerometer which has a lower threshold sensitivity than prior art, floated-pendulum accelerometers.

It is another object of the present invention to provide a pendulous accelerometer which has greater linearity than prior art floated-pendulum accelerometers in response to a wide range of applied accelerations.

It is still another object of the present invention to provide a floated-pendulum accelerometer employing a vibratable pendulum support member that vibrates at a frequency substantially equal to the frequency of excitation of the pendulum element displacement sensors or a harmonic thereof for eliminating the static friction and minimizing and holding constant the kinetic friction in the pendulum element's support bearings.

It is yet another object of the present invention to eliminate static friction in pendulum support bearings.

It is still another object of the present invention to decrease and hold substantially constant the kinetic friction in pendulum support bearings when the pendulum element is caused to pivot.

It is a further object of the present invention to provide a mechanism for introducing dither parallel and perpendicular to the rotational axis of a floated-pendulum accelerometer, wherein the displacement sensors are constructed to be insensitive to the dither motion.

The novel features which are believed to be characteristic of the invention, both as to its organization and method of operation, together with further objects and advantages thereof, will be better understood from the following description considered in connection with the accompanying drawings in which one embodiment of the invention is illustrated by way of example. It is to be expressly understood, however, that the drawings are for the purpose of illustration and description only and are not intended as a definition of the limits of the invention.

In the drawings:

FIGURE 1 illustrates an exploded isometric view of a preferred embodiment of floated-pendulum accelerometer construction in accordance with the present invention;

FIGURE 1a illustrates the orientation of three operational axes of the preferred embodiment of floated-pendulum accelerometer illustrated in FIGURE 1;

FIGURE 2 illustrates an assembled side view of the preferred embodiment of floated-pendulum accelerometer illustrated in FIGURE 1, where in FIGURE 2 various sections have been cut away to illustrate otherwise hidden components and structures of the accelerometer;

FIGURE 3 is a top view of the base structure utilized in the floated-pendulum accelerometer shown in FIGURES 1 and 2, FIGURE 3 illustrating this element as it appears when removed from the accelerometer;

FIGURE 4 is a schematically-illustrated end cross section of the assembled preferred embodiment of floated-pendulum accelerometer illustrated in FIGURES 1 and 2; and FIGURE 5 is a partly-block, partly-circuit diagram illustrating the electrical interconnections between the units of the floated-pendulum accelerometer of the present invention.

With reference now to the drawings wherein like or corresponding parts are similarly designated throughout the several views, there is shown in FIGURE 1 an exploded, isometric view of a pendulous accelerometer 10 mechanized in accordance with the teachings of the present invention to have a low threshold sensitivity. The accelerometer 10 includes a base element 11 on which is mounted a generally U-shaped member 15 for retaining, between its arms, a buoyant pendulous element 19. A pair of jewel cups 25 (only one of which is shown) and a pair of pivots 23, cooperating as a pair of jewel-and-pivot bearings, rotatably mount the pendulous element 19 within the space between the arms of the U-shaped member 15. In response to acceleration forces applied parallel to a sensitive axis of the accelerometer and perpendicular to a rotational axis, defined by the pair of jewel-and-pivot bearings, the pendulous element 19 tends to pivot about the rotational axis. By means of a pair of pick-off signal generators 21 and 22 mounted respectively to the base element 11 in proximity to an end of the pendulous element 19, the tendency of the pendulous element 19 to pivot is converted to a proportional position error signal. A demodulator-amplifier 37 operates upon the position error signal and derives therefrom a torquer signal that is applied to a pair of forcing units 29 and 30. Each forcing unit includes a torquer magnet 33 and a torquer coil 35 positioned on the base element 11 and the pendulous element 19, respectively, in such a manner that they are in registry with one another when the accelerometer 10 is assembled. The forcing units 29 and 30 operate to apply a restoring torque to the pendulous element 19 for maintaining it in a substantially neutral position. In order to allow the pendulous element 19 to be freely rotated by applied acceleration forces without friction drag in the jewel-and-pivot support bearings, a pair of electromagnets 13 and 17 have been mounted in the base element 11, one beneath each tine of the U-shaped member 15. The electromagnets 13 and 17 are serially coupled and both receive an AC reference signal that is also applied to the pair of pick-off signal generators 21 and 22. The U-shaped member 15 is constructed to be similar in shape to a tuning fork having an identifiable resonant frequency. In response to the applied AC reference signal, the two electromagnets 13 and 17 cause the U-shaped member 15 to vibrate at substantially its resonant frequency. The vibratory motion, referred to as "dither," has one component along the rotational axis, and also has a component perpendicular thereto, so that the pivots 23 do not make any considerable contact with their corresponding jewel cups 25, as any and every bearing has some though minute bearing play. The accompanying frictional forces produced therebetween are, therefore, substantially reduced.

It will be understood from the following description that the mechanism of the present invention for introducing "dither" into pendulum support bearings may be employed in many different types of prior art accelerometers and inertial instruments. It is believed by the present inventor, however, that the employment of such a dithering mechanism in a preferred design of torque-balance, floated-pendulum accelerometer will result in a superior accelerometer having an extremely low threshold sensitivity and superior scale factor characteristics. Such a preferred design of accelerometer is described in U.S. Patent 3,078,721, issued on Feb. 26, 1963, for a "Miniaturized Temperature-Insensitive Accelerometer." In accordance with the teachings of the above-referenced patent, the pendulous element 19 of the present accelerometer is constructed to have its center of buoyancy and center of mass offset predetermined distances from the rotational axis, on either side thereof. This feature enables the variations in scale factor caused by temperature-induced changes in the magnetic field strength of the permanent magnets 33 of the forcing units 29 and 30 to substantially counteract the changes in scale factor attributable to the temperature-induced buoyant force variations of the flotation fluid which fills the voids between the base element 11 and a cover assembly 12. Thus, an accelerometer is provided which is extremely accurate, first, because static friction in its pendulum support bearings has been eliminated and kinetic friction has been reduced and held constant rather than being permitted to vary non-linearly and, second, because the operating accelerometer is insensitive to its environmental temperature.

As explained hereinabove, the pendulous element 19 is freely mounted to pivot about its rotational axis in response to acceleration forces applied perpendicular to that axis. Visualization of the various operational axes of the present accelerometer may be assisted by reference in FIGURE 1a. In FIGURE 1a are illustrated the three mutually perpendicular axes of a pendulous accelerometer, which are drawn parallel to corresponding axes of the accelerometer 10 illustrated in FIGURE 1. More particularly, accelerations to be sensed by such an accelerometer are said to be applied parallel to a sensitive axis (SA). The applied accelerations cause the accelerometer's pendulous mass to pivot about a rotational axis (RA), generally defined by the pendulum support bearings, which is perpendicular to the sensitive axis. In its neutral position (that is, when there are no unbalanced forces acting on the pendulous element) the resting position of the pendulous element defines a pendulous axis (PA), which is orthogonal to both the sensitive and rotational axes. Accordingly, at first glance one might expect that the forces [parallel to the sensitive axis (SA) of the accelerometer 10] applied to the pendulous element 19 by the vibrating U-shaped member 15, would cause erroneous or unintelligible acceleration signals to be generated, especially since the vibration may be at the same frequency as that at the pick-off signal generators are excited. In the accelerometer of the present invention this condition does not occur. Futhermore, so that any minute stray translational movements of the pendulous element 19 are not confused with acceleration-produced pendulum movement, the pick-off signal generators 21 and 22 are constructed to be insensitive to pure translational movement.

For the purpose of better illustrating the internal construction of the accelerometer 10, reference is made to FIGURES 2 and 3. In FIGURE 2 accelerometer 10 is shown in a partially cross-sectioned side view showing the pendulous element 19 in its neutral position. Portions of the cover assembly 12 have been cut away to permit observation of one of the two expansion bellows 38 contained therein. It will be understood that, preferably, the vacant space between the base element 11 and the cover assembly 12 will be filled with an inert, low viscosity flotation fluid, such as Fluoralube, so as to float the pendulous element 19 and hence reduce the load carried by the pendulum support bearings.

As illustrated in FIGURE 2, the dithering mechanism (comprising the U-shaped member 15 and the electromagnets 13 and 17) is positioned near the center of the accelerometer 10. It can be seen in FIGURES 2 and 3 that the electromagnet 17 is housed within a cylindrical cavity 18 in the base element 11. Similarly, the electromagnet 13 is housed within a cavity 14; the electromagnet 13 and the cavity 14 are not visible in FIGURE 2, but are shown in FIGURE 3. The recessing of the electromagnets within the cavities, if the proper material is chosen for base element 11, substantially restrains the respective magnetic fields to act only on the tines of the U-shaped member 15, so as not to interact with the magnetic field of the torquer magnets 33 or the pick-off signal generators 21 and 22. As is further shown in FIGURE 2, the pendulous element 19 is held in its neutral position by the U-shaped member 15, which is coupled to the pendulous element by the pivots 23. When the pendulous element 19 is in its neutral position, a pick-off coil 26 of each pick-off signal generator is equally distant from each of a corresponding set of four exciter coils 40, 41, 42, and 43. Each set of four exciter coils is divided into two pairs of coils, each coil pair generating a magnetic field, in response to the applied AC reference signal, which is equal in magnitude to the field of the other pair, but opposite in polarity. When the pick-off coil 26 is in the neutral position, therefore, there is a zero net voltage developed across the coil 26. For the purpose of better illustrating, in FIGURE 2, the positioning of other components of the pick-off signal generator 22, the exciter coils 42 and 43 have not been shown.

The application of acceleration forces to the accelerometer 10, parallel to its sensitive axis (SA), tends to cause the pendulous element 19 to pivot away from the pendulous axis (PA) about its rotational axis (RA). Detection of this tendency of the pendulous element to pivot is accomplished by the pick-off signal generators 21 and 22. As the pendulous element tends to pivot, one pick-off coil 26 will tend to rise from the neutral position and the other pick-off coil 26 will tend to lower from the neutral position. A voltage is induced in the pick-off coils 26 by the end flux coupled from the exciter coils, and this induced voltage is applied to a demodulator-amplifier 37. From the induced voltage a displacement error signal is derived by the demodulator-amplifier 37. By comparing the magnitude and phase of the error signal to that of the AC reference signal, the amount and direction, respectively, of displacement of the pendulous element 19 may be determined. The error signal is transmitted via electrical conductors to the torquer coils 35 of the forcing units. Each torquer coil 35 is wound around a coil form 36 which is attached to the pendulous element 19. In response to the application of the error signal, each torquer coil 35 generates an electromagnetic field which cooperates with the magnetic field of its associated permanent magnet 33 to exert a force on the pendulous element 19 for returning the pendulous element to the neutral position. As shown in FIGURES 2 and 3, the permanent magnet 33, positioned within the base element 11 with one of its magnetic poles facing the pendulous element 19, is provided with a highly permeable cap 52 positioned over the end of the magnet 33. The permanent magnet 33 is also provided with a highly permeable ring 54 which circumscribes the magnet 33. The torquing coil 35 is positioned in the annular space between the cap 52 and the ring 54, the latter two elements tending to cause the substantial portion of the magnetic field produced by the magnet 33 to be passed radially through the gap where the torquing coil 35 is normally positioned. A magnetically polarized disc 50 is positioned contiguous with the top of the cap 52 for preventing the magnetic field, generated by the magnet 33, from affecting the operation of the pick-off exciters.

Thus, in overall operation, it is apparent that accurate response of the pendulous element 19 to applied acceleration forces is of primary importance, since, the output signal of the accelerometer is dependent upon the magnitude of current applied to the torquing coils 35 which, in turn, is dependent upon the response of the pendulous element to applied accelerations. Although such be the case, friction that exists in the jewel-and-pivot support bearings (even after the pendulous element has been floated in an inert fluid) causes the accelerometer's response to a known acceleration to be inconsistent. To overcome this problem the present inventor has connected the serially-coupled pair of electromagnets 13 and 17 in parallel with the exciter coils for vibrating the U-shaped pendulum support member 15. As shown in FIGURE 4, this vibratory motion or dither of the U-shaped member 15 is transmitted to the jewel-and-pivot bearings so as to cause the pivot 25 to vibrate in its respective jewel cup 23 in a direction having one component in the direction of the rotational, or pivot axis, and another component perpendicular to the pivot axis. This vibration operates to maintain the pivot 25 essentially floating in the flotation fluid centrally within the jewel cup 23, thereby substantially eliminating static friction and reducing and holding substantially constant the kinetic friction in the bearings.

Referring now to FIGURE 5, it is apparent that the exciter coils 43, 42, 41, and 40, of each pick-off signal generator, are serially connected in the foregoing order to a source of the AC reference signal. In response to the application of the AC reference signal, the exciter coils 40 and 43 of the pick-off signal generator 21 generate fields having the same polarity (when viewed from the pick-off coil) as the fields generated by the coils 41 and 42 in the pick-off signal generator 22 at the opposite end of the pendulous element. Arrows have been drawn between the various exciter coils in FIGURE 5 to illustrate the polarity of the magnetic field generated. Similarly, the exciter coils 41 and 42 of pick-off signal generator 21 generate a field in the same direction as the exciter coils 40 and 43 of the pick-off signal generator 22. Hence, the pick-off coils 26 are insensitive to pure translational movement of the pendulum element 19, as well as being insensitive to rotational movement of the pendulous element about other axes than the rotational axis (RA). This feature is possible because, during such movement, the pick-off coils 26 couple equal amounts of magnetic flux, but the flux coupled by one pick-off coil 26 is opposite in polarity to the flux coupled by the other pick-off coil. As further shown in FIGURE 5, the serially-coupled pick-off coils 26 have one terminal connected to ground and another terminal connected to a demodulator-amplifier 37. The demodulator-amplifier 37 is responsive to the application of the induced voltage signal, generated by the pick-off signal generators 21 and 22, for comparing this induced signal to the AC reference signal and transforming the induced signal into a DC displacement error signal whose magnitude is representative of the magnitude of displacement of the pendulous element from its neutral position and whose polarity is representative of the direction of diplacement. It will be recognized by those skilled in the art that the design of the demodulator-amplifier employed by the accelerometer of the present invention is determined by the electrical and mechanical parameters of the accelerometer itself and by the parameters of the system wherein the accelerometer will be used. Moreover, those skilled in the art know that many different forms of demodulator-amplifier may be used in a pendulous accelerometer, but that a preferred demodulator-amplifier 37 should include a stabilizing network for inhibiting oscillation in the servo-loop. A resistor 70 is connected from an output terminal 68 of the demodulator-amplifier 37 to ground. The resistor 70 is normally termed a "scale factor resistor," the value of which is determined during the final accelerometer assembly operation.

Continuing with the explanation of FIGURE 5, the displacement error signal is applied by the demodulator-amplifier 37 to the serially connected torquer coils 35. As hereinbefore explained, the torquer coils 35 generate electromagnetic fields that act, in combination with the magnetic field of the permanent magnets 33, to produce a force on the pendulous element to return the pendulous element 19 to its neutral position. As shown in FIGURE 5, the electromagnets 13 and 17 are connected in series, having one terminal of the electromagnet 17 connected to ground and a terminal of the electromagnet 13 connected to the source of AC reference signal. In contrast to the serially-coupled pair of torquer coils 35, which are connected so that the two forcing units will always produce an oppositely directed but equal force for operating the forcing units in push-pull fashion, the windings of the electromagnets 13 and 17 are connected so as to apply equal parallel forces in the same direction, i.e. perpendicularly with respect to the rotational axis, on their respective tines of the U-shaped member 15.

It will be understood that the electrical interconnections between the associated components of the accelerometer are established through electrical conductors routed at convenient locations within the accelerometer case. With reference to FIGS. 1, 2, and 3, it can be seen that a plurality of terminals 61 are provided on one side of the base element 11 for carrying the signals, transmitted through the electrical conductors that couple the units of the accelerometer 10, from the inside of the accelerometer case to a pair of ports 60 in which external connections to the accelerometer may be made. Flexible wires may be used to establish electrical connection to the pick-off coils 26 and the torquing coils 35 mounted on the pendulous element 19. For example, a flexible lead 24 is illustrated in FIGURE 2 interconnecting a terminal 31 and a terminal 34 on the pendulous element 19. For purposes of clarity and to eliminate unnecessary drawing complexity the remaining flexible wires and other lead wires have been deleted from the figures, it being felt by the present inventor that the manner in which such connection is made is well known in the art.

Referring again to FIGURE 4, and considering once more the mechanism provided for introducing axial dither to the pendulous element support bearings, it will be recalled that the coils of the electromagnets 13 and 17 are supplied with the AC reference signal for alternately attracting and repelling the respective tines of the U-shaped member 15, which thereby causes the ends of the tines to move back-and-forth in a direction parallel to the rotational axis (RA) of the pendulous element 19. If the accelerometer is rotated 90 degrees, such that the rotational axis (RA) is vertical and the sensitive axis (SA) is horizontal, the pendulous element 19 is said to be hung in a gate-wise position. In the conventional, floated-pendulum accelerometer, such an orientation of the accelerometer's pendulous element tends to increase both static and kinetic friction in the pendulum support bearings because the weight of the pendulous element acts over an effective lever arm in a direction in which the pendulum will not rotate. Of course, the sensitivity of the prior art instrument is concomitantly limited by such an orientation.

On the other hand, the accelerometer of the present invention, basically illustrated in FIGURE 4, does not suffer from loss of sensitivity and non-linearity of response when the pendulous element 19 is hung in a gate-wise manner. It has been suggested that, in co-action with the damping of translational pendulum movement by the flotation fluid and due to the generally spherical construction of the pivot tips and jewel cups, the vibration applied at a high frequency (as, for example, 5 kilocycles) to the jewel-and-pivot bearings, on the average, never allows the force couple (due to gate-wise mounting) to substantially displace the pivot 23 from its central location in the jewel cup 25. The amplitude of vibration of each tine of the U-shaped member 15 has been measured and found to be on the order of ten microinches. It is, therefore, clear that remarkable reduction in the kinetic friction in pivot bearings can be obtained, together with substantial elimination of static friction, by axially vibrating the pivot with the respect to its jewel cup, when such pivot bearings are used to support a member whose motion is damped.

It is to be understood that the above described arrangements are illustrative of the application of the principles of the invention. Numerous other arrangements may be devised by those skilled in the art without departing from the spirit and scope of the invention. For example, the electromagnets 13 and 17 may be located in the sides of the accelerometer case 12 for acting directly on the tines in a direction parallel to the rotational axis (RA) defined by the pendulum support bearings. Accordingly, it is to be expressly understood that the invention is limited only by the spirit and scope of the appended claims.

What is claimed as new is:

1. A pendulous accelerometer having a low threshold sensitivity, said accelerometer comprising:
   a base;
   a cradle mounted to said base, said cradle having a pair of arms each having a predetermined resonant frequency;
   a pendulous element movably mounted at a predetermined attitude between said arms within said cradle;
   a pair of bearings movably coupling said pendulous element to said arms, each of said bearings including an inner and an outer member, said bearings defining a rotational axis of said pendulous element;
   pick-off means for detecting displacement of said pendulous element from said predetermined attitude in response to applied acceleration forces and generating a corresponding error signal, said pick-off means being mounted contiguous with the ends of said pendulous element;
   torquer means responsive to the application of said error signal for exerting a force on said pendulous element to return said pendulous element to said predetermined attitude, said torquer means being mounted in said base;
   means for vibrating said arms at their resonant frequency or a harmonic thereof in response to a signal having a frequency equal to said predetermined resonant frequency to generate a centralizing vibratory motion between said inner and said outer bearing members, thereby effectively eliminating static friction and substantially minimizing kinetic friction therebetween;
   a cover assembly attached to said base for protecting the accelerometer from its environment; and
   a flotation fluid filling the voids between said base and said cover assembly for substantially supporting said pendulous element by buoyant forces.

2. A pendulous accelerometer as defined in claim 1 wherein said cradle comprises a generally U-shaped member constructed to operate substantially as a tuning fork.

3. A pendulous accelerometer as defined in claim 2 wherein said means for vibrating said arms comprises a pair of serially connected electromagnets, each electromagnet being mounted within said base beneath a tine of said U-shaped member for alternately attracting and repelling said tine to introduce vibratory motion to said bearings substantially parallel to said rotational axis of said pendulous element.

4. A pendulous accelerometer as defined in claim 3 wherein said pick-off means includes a plurality of exciter coils coupled to said base and a pick-off coil coupled to said pendulous element, said pick-off coil being normally positioned in proximity with said exciter coils, said pick-off means generating an electrical error signal proportional to the displacement of said pick-off coil from said exciter coils in response to applied acceleration forces.

5. A pendulous accelerometer as defined in claim 4 wherein said torquer means comprises a torquer magnet positioned within said base and a torquer coil coupled to said pendulous element, said torquer coil and magnet being positioned adjacent to one another, said torquer means being responsive to said error signal for applying to said pendulous element a restoring torque equal and opposite to a torque produced on said pendulous element by applied acceleration forces.

6. A pendulous accelerometer as defined in claim 5 wherein said pendulous element is constructed to have a center of mass and center of buoyancy positioned one from the other on either side of said rotational axis of said pendulous element, said center of mass and said center of buoyancy lying along a predetermined line that orthogonally intersects said rotational axis of said pendulous element.

7. A pendulous accelerometer as defined in claim 6 wherein said pair of bearings comprises a pair of jewel-and-pivot bearings, each of said jewel-and-pivot bearings having a pivot member corresponding to said inner member and a jewel cup member corresponding to said outer member.

8. In a pendulous accelerometer having a low threshold sensitivity for measuring applied acceleration forces, the combination comprising:
   a container;
   a pendulous element having a rotational axis therethrough;
   support means for holding said pendulous element within said container said support means including mounting arms extending in a direction transverse to said rotational axis, each of said mounting arms having one end thereof rigidly fixed;

means for damping movement of said pendulous element;

a pair of bearings for rotatably coupling said pendulous element to said support means, each of said bearings including an inner member and a corresponding outer member, said bearings defining said rotational axis of said pendulous element, each of said bearings rotatably coupling said pendulous element to one of said mounting arms at a point a predetermined distance from said fixed end of said arm; and means for vibrating each of said mounting arms at a predetermined frequency to generate a vibrating motion in said bearings having a component of vibration parallel to said rotational axis and a second component of vibration perpendicular to said rotational axis, said vibrating motion tending to maintain said inner member substantially centered in said outer member.

9. The combination defined in claim 8 wherein said support means comprises a generally U-shaped member having at least two resilient mounting arms, each constructed to have a resonant frequency substantially equal to said predetermined frequency.

10. The combination defined in claim 9 wherein said means for vibrating comprises a pair of electromagnets that are mounted in proximity to the arms of said generally U-shaped member said electromagnets being operative to elastically deflect at least one of said mounting arms at said predetermined frequency to generate said vibrating motion in said bearing.

11. The combination defined in claim 10 which further includes a dense flotation fluid filling the voids within said container for supporting said pendulous element by buoyant forces.

12. An instrument comprising:
a tuning fork having a pair of tines;
a pendulous sensing element;
a pair of bearings rotatably coupling said sensing element to said tines of said tuning fork;
means for detecting displacements of said sensing element; and
means for vibrating said tuning fork to generate a vibratory motion along the rotational axis of said sensing element.

13. The instrument defined in claim 12 wherein said detecting means comprises a pick-off means excited by an applied signal having a frequency equal to an integral multiple of the frequency of vibration of said tuning fork.

14. The instrument defined in claim 13 wherein said vibrating means comprises a pair of serially coupled electromagnets excited by said applied signal having a frequency equal to an integral multiple of the frequency of vibration of said tuning fork.

15. An inertial instrument comprising:
a rotatable element;
a pair of resilient support means for defining an axis of rotation for said rotatable element each of said resilient support means having one end rigidly fixed and the other end freely vibratable, said rotatable element being positioned between points on said pair of support means which are predetermined distances from the fixed ends of said support means;
means for measuring rotational movement of said rotatable element, said means of measuring movement including an electromagnetic, field-generating means excited at a selected frequency;
means for damping movement of said rotatable element; and
means for elastically deflecting said support means to provide simultaneous, oppositely-directed reciprocal motion of each of said support means along the rotational axis of said rotatable element, and elastic deflection causing dither along and perpendicular to the rotational axis of said rotatable element at a frequency equal to or a multiple of said selected frequency.

16. An inertial instrument as defined in claim 15 wherein said damping means comprises a container surrounding said rotatable element, and a flotation fluid filling the voids within said container for substantially supporting said rotatable element by buoyant forces.

17. An accelerometer comprising:
a tuning fork-like support element;
a pendulous mass;
bearings rotatably coupling said pendulous mass between the tines of said tuning fork-like support element, said bearings defining a rotational axis for said pendulous mass; and
a plurality of electromagnets for vibrating the tines of said tuning fork-like support element to cause a vibratory motion in said bearings having a component in a direction which is radial with respect to said rotational axis, one electromagnet being mounted beneath each tine of said tuning fork-like element.

References Cited
UNITED STATES PATENTS

| | | | |
|---|---|---|---|
| 2,978,910 | 4/1961 | Aske | 73—515 |
| 3,018,142 | 1/1962 | Warnock | 74—5 |
| 3,046,795 | 7/1962 | Wilkerson | 308—1 X |
| 3,078,721 | 2/1963 | Sawyer | 73—516 X |
| 3,171,696 | 3/1965 | Houghton | 308—9 X |

JAMES J. GILL, *Primary Examiner.*

RICHARD C. QUEISSER, *Examiner.*